(12) United States Patent
Hill, II et al.

(10) Patent No.: US 11,195,339 B2
(45) Date of Patent: Dec. 7, 2021

(54) AUGMENTED REALITY SYSTEM

(71) Applicant: Spin Master Ltd., Toronto (CA)

(72) Inventors: Robert Reynolds Hill, II, Toronto (CA); Hitesh Shah, Brampton (CA); Amir Haddadi, Richmond Hill (CA)

(73) Assignee: Spin Master Ltd., Toronto (CA)

( * ) Notice: Subject to any disclaimer, the term of this patent is extended or adjusted under 35 U.S.C. 154(b) by 0 days.

(21) Appl. No.: 16/949,709

(22) Filed: Nov. 11, 2020

(65) Prior Publication Data
US 2021/0192846 A1   Jun. 24, 2021

Related U.S. Application Data

(60) Provisional application No. 62/933,967, filed on Nov. 11, 2019.

(51) Int. Cl.
*G06T 19/00* (2011.01)
*G02B 27/01* (2006.01)
*G06F 3/01* (2006.01)

(52) U.S. Cl.
CPC ........ *G06T 19/006* (2013.01); *G02B 27/0179* (2013.01); *G06F 3/011* (2013.01)

(58) Field of Classification Search
None
See application file for complete search history.

(56) References Cited

U.S. PATENT DOCUMENTS

| 9,420,262 | B1 | 8/2016 | Myers | |
|---|---|---|---|---|
| 2015/0130790 | A1* | 5/2015 | Vasquez, II | G06T 19/006 345/419 |
| 2016/0093107 | A1* | 3/2016 | Yamamoto | A63F 13/212 345/633 |
| 2018/0015364 | A1* | 1/2018 | Barney | A63F 13/10 |
| 2018/0255285 | A1 | 9/2018 | Hall et al. | |
| 2018/0314416 | A1 | 11/2018 | Powderly et al. | |
| 2019/0038978 | A1* | 2/2019 | Rider | A63F 13/285 |
| 2020/0188780 | A1* | 6/2020 | Boudville | A63F 13/31 |
| 2020/0356161 | A1* | 11/2020 | Wagner | A63B 69/125 |

OTHER PUBLICATIONS

Search Report and Written Opinion dated Feb. 4, 2021 for corresponding PCT application No. PCT/CA2020/051523.

* cited by examiner

*Primary Examiner* — Ryan M Gray
(74) *Attorney, Agent, or Firm* — Millman IP Inc.

(57) ABSTRACT

An augmented reality system is provided, including a physical apparatus operable to change detectably by a human between a first state and a second state, and an augmented reality application. The physical apparatus includes a signal receiver for receiving a signal, and at least one controllable element operable to effect the change between the first state and the second state upon receiving the signal. The AR application, when executed by at least one processor of a computing device, the computing device having at least one camera and a display, cause the computing device to capture at least one image of the physical apparatus, generate a virtual reality object that is presented in the at least one image on the display, and transmit the signal to the physical apparatus to cause the at least one controllable element of the physical apparatus to switch between the first state and the second state.

23 Claims, 13 Drawing Sheets

AUGMENTED REALITY SYSTEM

CROSS-REFERENCE TO RELATED APPLICATIONS

This application claims the benefit of U.S. Provisional Patent Application No. 62/933,967, filed Nov. 11, 2019, the contents of which are incorporated herein by reference in their entirety.

FIELD

The specification relates generally to augmented reality systems.

BACKGROUND OF THE DISCLOSURE

It is known to provide augmented reality apps for smartphones and other portable electronic devices wherein a virtual object is inserted into an image of a real-world environment. A sense of immersion is provided for the user by placing the virtual object in such a way that part of it is occluded by elements of the real-world environment, and part of it occludes other elements of the real-world environment. However, it would be beneficial to provide the user with an increased sense of immersion when using an augmented reality app.

SUMMARY OF THE DISCLOSURE

In one aspect, there is provided an augmented reality system, comprising: a physical apparatus having: a platform; at least one support connected to and supporting the platform on a surface, the at least one support being actuatable to move relative to the platform between at least two positions to cause the platform to move relative to the surface on which the physical apparatus is resting; and a signal receiver for receiving a signal; and an augmented reality application in the form of computer-readable instructions stored on a computer readable medium, the augmented reality application, when executed by at least one processor of a computing device, the computing device having at least one camera and a display, cause the computing device to capture at least one image of the physical apparatus, generate a virtual reality object that is presented in the at least one image on the display, and transmit the signal to the signal receiver of the physical apparatus to cause the at least one support to move to one of the at least two positions.

The at least one support can include at least two supports that are actuatable to move relative to the platform between at least two positions, each of the at least two supports being actuatable to independently move relative to the platform.

The signal can be at least partially audial, and the computing device can include a speaker for transmitting the signal.

The signal can be at least partially ultrasonic audio.

The signal can include a state change identifier corresponding to a change in state to be effected by the physical apparatus. The signal can include at least one parameter associated with the state change identifier for modifying the state change to be effected by the physical device. The at least one parameter can include timing information for timing the state change. Subsequent signals including the same state change identifier can be transmitted to counter signal loss.

When the augmented reality application is executing on the computing device, the computing device can provide a control interface enabling a user to at least partially control at least one of a behavior of the virtual reality object and a state change of the physical apparatus.

When the user controls the behavior of the virtual reality object, the augmented reality application can determine a resulting status change in the physical apparatus and transmit a signal to the physical apparatus to effect the state change.

In another aspect, there is provided an augmented reality system, comprising: a physical apparatus having at least one light-emitting element to selectively illuminate at least one position relative to the light-emitting element, and a signal receiver for receiving a signal; and an augmented reality application in the form of computer-readable instructions stored on a computer readable medium, the augmented reality application, when executed by at least one processor of a computing device, the computing device having at least one camera and a display, cause the computing device to capture at least one image via the at least one camera, generate a virtual reality object that is presented in the at least one image on the display, and transmit the signal to the signal receiver of the physical apparatus to cause the at least one light-emitting element of the physical apparatus to selectively illuminate one of the at least one position on a surface adjacent to or at a location of the virtual reality object on the display.

The at least one light-emitting element can be at least two light-emitting elements, the at least one position can be at least two positions, and each of the at least two light-emitting elements can be configured to illuminate a separate one of the at least two positions.

The surface can be provided by a translucent material, and each of the at least two light-emitting elements illuminates the surface from an underside thereof.

The signal can be at least partially audial, and the computing device can include a speaker for transmitting the signal. The signal can be at least partially ultrasonic audio.

The signal can include a state change identifier corresponding to a change in state to be effected by the physical apparatus. The signal can include at least one parameter associated with the state change identifier for modifying the state change to be effected by the physical device. The at least one parameter can include timing information for timing the state change.

Subsequent signals including the same state change identifier can be transmitted to counter signal loss.

In a further aspect, there is provided an augmented reality system, comprising: a physical apparatus operable to change detectably by a human between a first state and a second state, the physical apparatus having: a signal receiver for receiving a signal; and at least one controllable element operable to effect the change between the first state and the second state according to a command; and an augmented reality application in the form of computer-readable instructions stored on a computer readable medium, the augmented reality application, when executed by at least one processor of a computing device, the computing device having at least one camera and a display, cause the computing device to capture at least one image of the physical apparatus, generate a virtual reality object that is presented in the at least one image on the display, and transmit at least the first signal and a second signal to the signal receiver of the physical apparatus with a command to cause the at least one controllable element of the physical apparatus to switch between the first state and the second state.

The command transmitted with each of the first signal and the second signal can include timing delay information for switching between the first state and the second state, and a difference between the timing delay information for the first signal and the timing delay information for the second signal can be at least partially based on a difference in transmission times of the first signal and the second signal.

The change in state can be at least mechanical. The physical apparatus can include at least one actuatable element coupled to an actuator for actuating the at least one actuatable element, and the signal can direct the physical apparatus to actuate the at least one actuatable element. The physical apparatus can include a platform, the at least one actuatable element can include at least one support connected to the platform and supporting the platform on a surface, and the actuator can include a motor. The at least one support can include at least two supports that are movable relative to the platform via the at least one motor, each of the at least two supports being independently movable relative to the platform.

The change in state can be at least visual. The physical apparatus can further include at least one light-emitting element.

The change in state is at least audible, and wherein the physical apparatus includes a speaker. The physical apparatus can further include a percussion element that is actuatable to strike one of another element of the physical apparatus and a surface upon which the physical apparatus is resting to generate a sound.

The signal can be at least partially audial, and the computing device can include a speaker for transmitting the signal. The signal can be at least partially ultrasonic audio.

The signal can include a state change identifier corresponding to a change in state to be effected by the physical apparatus. The signal can include at least one parameter associated with the state change identifier for modifying the state change to be effected by the physical device. The at least one parameter can include timing information for timing the state change.

When the augmented reality application is executing on the computing device, the computing device can provide a control interface enabling a user to at least partially control at least one of a behavior of the virtual reality object and a state change of the physical apparatus. When the user controls the behavior of the virtual reality object, the augmented reality application can determine a resulting status change in the physical apparatus and transmit a signal to the physical apparatus to effect the state change.

In yet another aspect, there is provided an augmented reality system, comprising: a physical apparatus operable to change detectably by a human between a first state and a second state, the physical apparatus having: a signal receiver for receiving a signal; and at least one controllable element operable to effect the change between the first state and the second state upon receiving the signal; and an augmented reality application in the form of computer-readable instructions stored on a computer readable medium, the augmented reality application, when executed by at least one processor of a computing device, the computing device having at least one camera and a display, cause the computing device to capture at least one image of the physical apparatus, generate a virtual reality object that is presented in the at least one image on the display, and transmit the signal to the signal receiver of the physical apparatus to cause the at least one controllable element of the physical apparatus to switch between the first state and the second state.

The change in state can be at least mechanical.

The physical apparatus can include at least one actuatable element coupled to an actuator for actuating the at least one actuatable element, and wherein the signal directs the physical apparatus to actuate the at least one actuatable element.

The at least one actuatable element can include at least one support and the actuator can include a motor, and the physical apparatus can include a platform supported by the at least one support that is movable relative to the platform via the at least one motor.

The at least one support can include at least two supports that are movable relative to the platform via the at least one motor, each of the at least two supports being independently movable relative to the platform.

The change in state can be at least visual.

The physical apparatus can further comprise at least one light-emitting element.

The physical apparatus can further comprise a display presenting an image corresponding to a location of the virtual reality object on the display.

The change in state can be at least audible.

The physical apparatus can further comprise a speaker.

The physical apparatus can further comprise a percussion element that is actuatable to strike one of another element of the physical apparatus and a surface upon which the physical apparatus is resting to generate a sound.

The signal can be at least partially audial, and the computing device can include a speaker for transmitting the signal.

The signal can be at least partially ultrasonic audio.

The signal can include a state change identifier corresponding to a change in state to be effected by the physical apparatus.

The signal can include at least one parameter associated with the state change identifier for modifying the state change to be effected by the physical device.

The at least one parameter can include timing information for timing the state change.

Subsequent signals including the same state change identifier can be transmitted to counter signal loss.

The signal and the subsequent signals can include a timing delay for timing the state change, wherein the timing delay transmitted with each subsequent signal is adjusted by a difference between a transmission time of the signal and a transmission time of the subsequent signal.

When the augmented reality application is executing on the computing device, the computing device can provide a control interface enabling a user to at least partially control at least one of a behavior of the virtual reality object and a state change of the physical apparatus.

When the user controls the behavior of the virtual reality object, the augmented reality application can determine a resulting status change in the physical apparatus and transmit a signal to the physical apparatus to effect the state change.

When the user controls the state change of the physical apparatus, the computing device can transmit the signal corresponding to the state change to the physical apparatus.

The computing device can simultaneously control the virtual reality object to perform an action.

In still another aspect, there is provided an augmented reality system, comprising: a physical apparatus; and an augmented reality application stored on a computer readable medium, the augmented reality application, when executed by at least one processor of a computing device, the computing device having at least one camera and a display, cause the computing device to capture at least one image of the physical apparatus, generate a virtual reality object that is inserted in the at least one image presented on the display, and changing a behavior of the virtual reality object if a state of the physical apparatus is changed detectably by a human.

The physical apparatus can have a communications device for communicating with the computing device.

The communications device can include a speaker.

The communications device can include a light-emitting device.

The communications device can include a radio-frequency transmitter.

The physical apparatus can include an orientation sensor for determining the orientation of the physical apparatus, the physical apparatus communicating orientation data corresponding to the orientation to the computing device.

The physical apparatus can include at least one accelerometer for detecting movement of the physical apparatus, the physical apparatus communicating movement data corresponding to the movement to the computing device.

The at least one image can comprise at least two images, and the augmented reality application can determine the state change of the physical apparatus by comparing a first of the at least two images captured by the at least one camera to a second pose of the physical apparatus in a second of the at least two images.

In a still further aspect, there is provided an augmented reality system, comprising: a physical apparatus; and an augmented reality application and model data for the physical apparatus stored on a computer readable medium, the augmented reality application, when executed by at least one processor of a computing device, the computing device having at least one camera and a display, cause the computing device to capture at least one image of the physical apparatus, compare the at least one image of the physical apparatus to the model data to detect a pose of the physical apparatus, generate a virtual reality object that is inserted in the at least one image presented on the display, and occluding at least a portion of the virtual reality object based on the model data and the detected pose.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
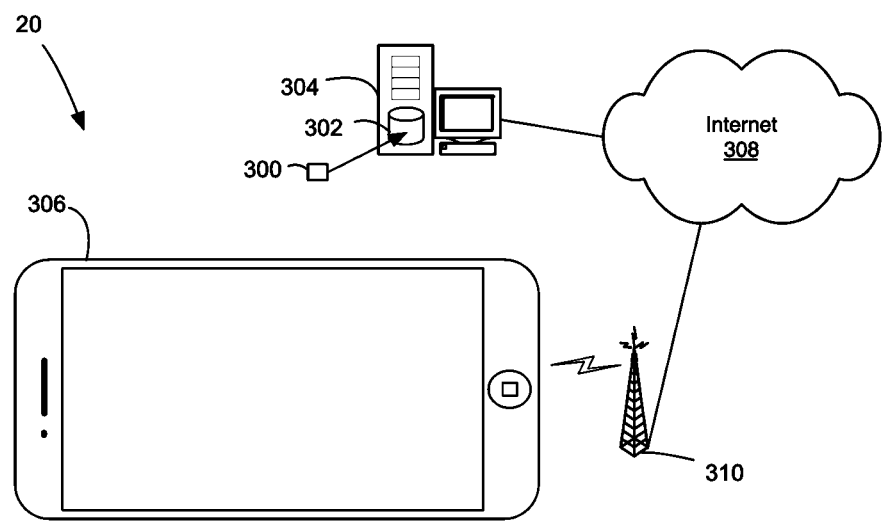
FIG. 1 shows an augmented reality system including a physical apparatus in the form of a cage and a computing device in the form of a smart phone in accordance with an embodiment thereof.
Figure 1:
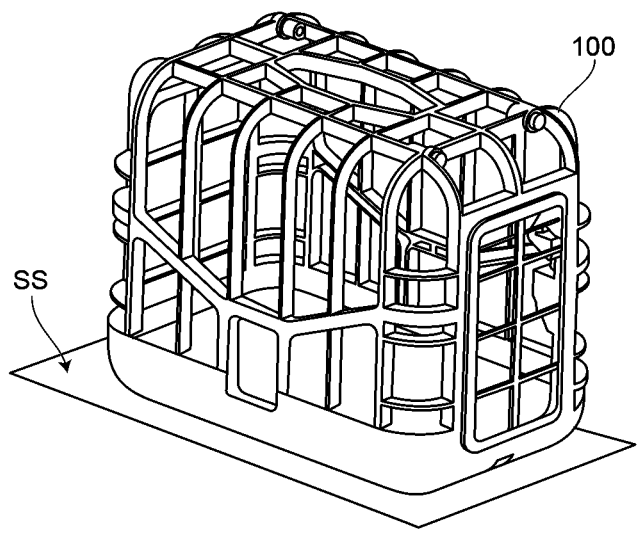

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

An augmented reality ("AR") system 20 in accordance with an embodiment of the present disclosure is shown in FIG. 1. The AR system 20 provides a more interactive, and more realistic user experience than some augmented reality systems of the prior art. The AR system 20 includes a physical apparatus 100, an AR application 300 that includes a set of computer-readable instructions and is stored in storage 302 and/or another computer readable medium of a server system 304. Also stored in storage 3A computing device 306 in the form of a smart phone is in communication with the server system 304 via the Internet 308 through a cellular base station 310, or via any other suitable data communications system. The computing device 306 can execute the AR application 300 to show a virtual reality object inserted into one or more images captured by the computing device 306.

The server system 304 can be one or more computer systems that are co-located or topologically distributed to serve the AR application 300. The AR application 300 can have a number of versions that are varied based on the type of computing device, the operating system and version thereof on which they are to be executed, the country, etc. Assets of the AR application may be hosted on different computer systems and cached. Further, the AR application 300 may rely on software and/or functionality that is already present or to be retrieved on the computing device 306 on which the AR application 300 is executed. For example, the AR application 300 may rely on an AR application programming interface ("API") that forms part of an operating system.

The AR application 300 includes apparatus data to assist in identifying the physical apparatus 100 in captured images. The apparatus data can include one or more colors of the physical apparatus 100, an identification of fiducial indicia on the physical apparatus 100, and/or model data representing the shape of the physical apparatus 100. In an alternative embodiment, the apparatus data can be provisioned separate from the AR application 300 as, for example, a resource file to allow for new physical apparatuses without updating the AR application 300.

Figure 11:
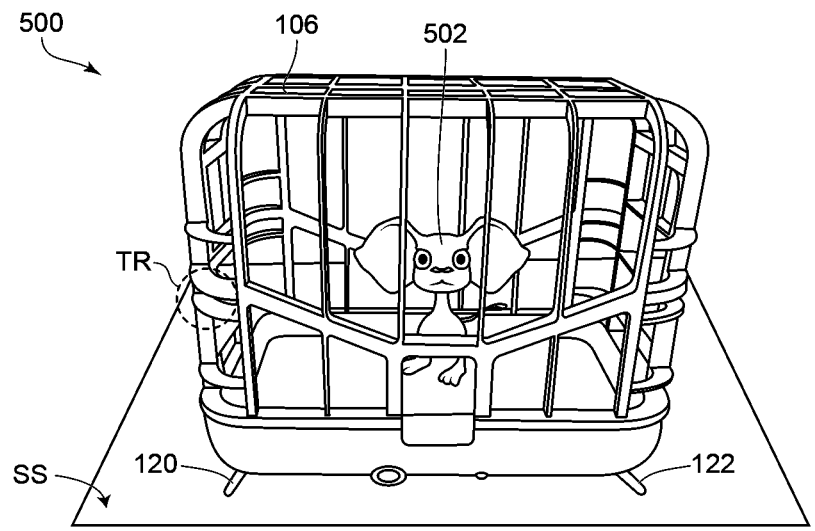
FIG. 11 shows an image captured by the augmented reality system of FIG. 1 with the virtual reality figure inserted therein.
Figure 12:
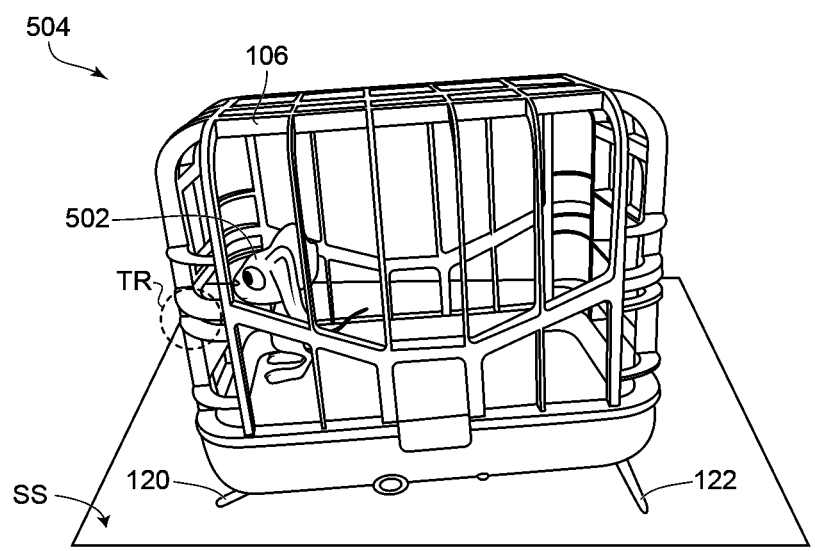
FIG. 12 shows the virtual reality figure positioned on a left side of the physical apparatus, and the physical apparatus depressed towards a support surface on a left side thereof.

As shown, for example, in FIGS. 11 and 12, the physical apparatus 100 is operable to change detectably by a human (i.e. by a user) between a first state (FIG. 11) and a second state (FIG. 12). The physical apparatus 100 includes a signal receiver 102 (FIG. 3) and at least one controllable element 104 that is operable to effect the change between the first state and the second state upon receiving the signal. In the embodiment shown in FIG. 1, the at least one controllable element 104 includes a cage 106, which is configured for holding the virtual reality object 502 therein, when viewed via the computing device 306. The cage 106 includes a plurality of bars 108, and a floor 110. Beneath the floor 110, the cage 106 further includes a storage chamber 112 which can be seen in FIG. 8. In the embodiment shown in FIG. 8, the change between the first state and the second state is a change in position of the cage 106. To that end, the storage chamber 112 houses a first motor 114, a second motor 116, a physical apparatus controller 118, a first support member 120 and a second support member 122.

The first and second motors 114 and 116 may be any suitable type of motor, such as servomotors or stepper motors. The first and second motors 114 and 116 together make up an actuator 124 that is for actuating the cage 106 to move the cage 106 between the first and the second positions. Each motor 114, 116 has an output shaft 126 on which a respective one of the first and second support members 120, 122 is held. Each of the first and second support members 120 includes a first arm 128 and a second arm 130, which are pivotally connected together at a pivot joint. A proximal end of the first arm 128 is mounted to the output shaft 126. At a distal end of the second arm 130 is a pair of feet 136 which support the cage 106 on a support surface, such as a tabletop, shown at SS. As the motors 114 and 116 rotate to different positions they adjust the position and/or the tilt angle of the cage 106. As can be seen in FIGS. 11 and 12, the motors 114 and 116 are operable to drive the first arms 128 of the first and second support members 120 and 122 to first angular positions as shown in FIG. 11 and to second angular positions as shown in FIG. 12. It will be understood that, when the angular positions of the first arms 128 are the same, then the cage 106 is level, and when the angular positions of the first arms 128 are different from one another, then the cage 106 is tilted at a non-zero tilt angle.

Figure 4:
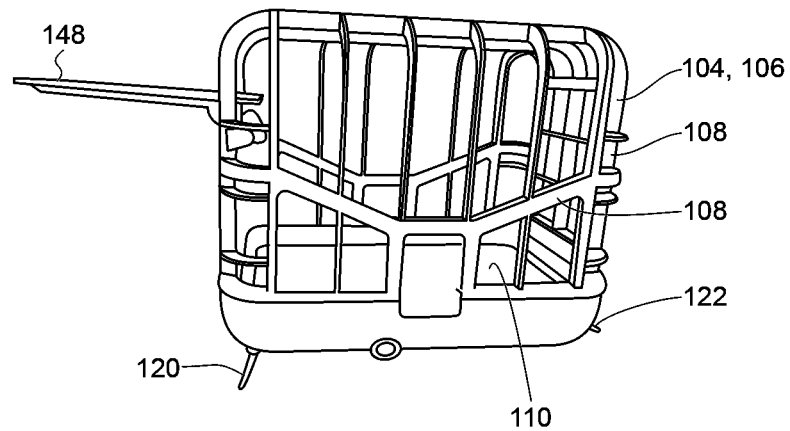
FIG. 4 is a front view of the physical apparatus of FIG. 1.
Figure 5:
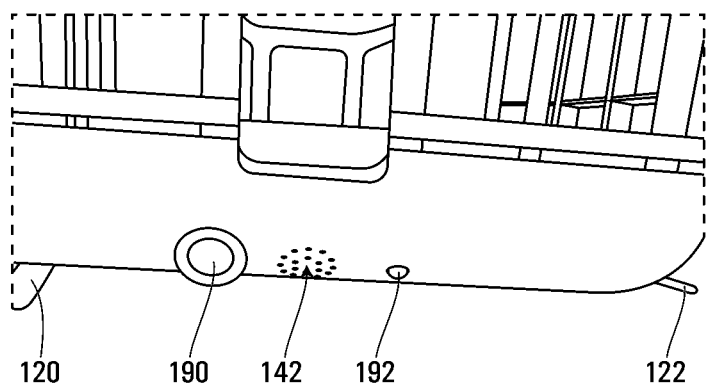
FIG. 5 shows various components in a bottom portion of the physical apparatus of FIG. 4.
Figure 6:
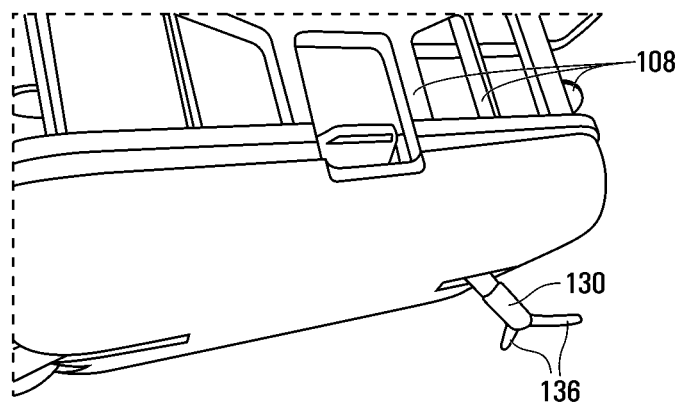
FIG. 6 shows a support extending from a bottom right side of the physical apparatus of FIG. 1.
Figure 7:
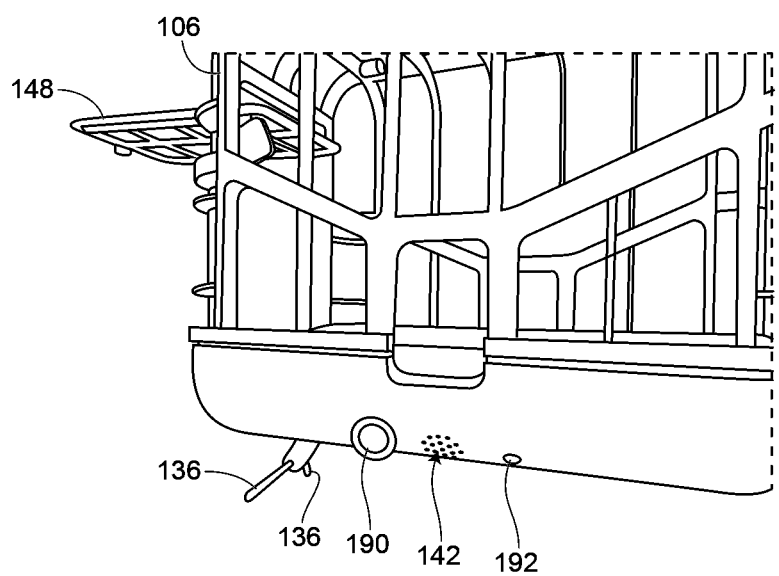
FIG. 7 shows a support extending from a bottom left side of the physical apparatus of FIG. 1.
Figure 19A:
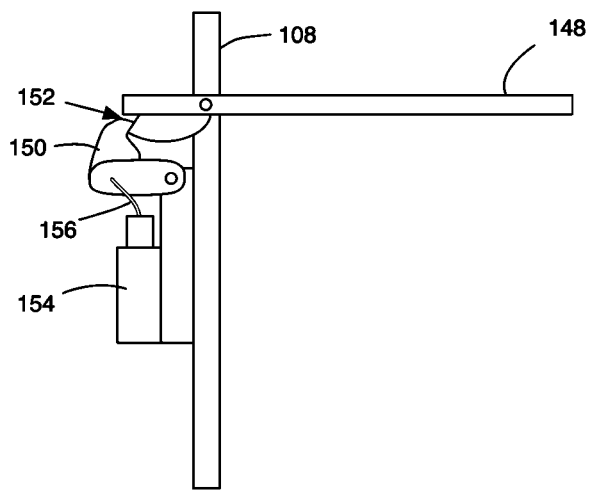
FIGS. 19A and 19B show a portion of the physical apparatus illustrating a cage door in an open position and a closed position.
Figure 19B:
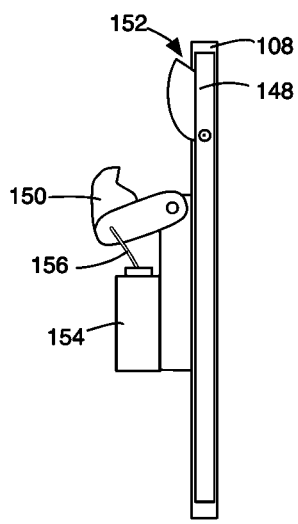

It will be noted that the controllable element 104 shown in FIGS. 11 and 12 is an actuatable element, in the sense that it moves. Another example of at least one actuatable element may include a cage door 148, which is shown in FIGS. 4, 7 and 19A in a first position (an open position), and in FIGS. 11, 12 and 19B in a second position (a closed position). As best shown in FIGS. 19A and 19B, the cage door 148 may be held in the open position via a latch member 150. The latch member 150 may be moveable (e.g. pivotable) between a locking position shown in FIG. 19A, in which the latch member 150 engages with a notch 152 on the cage door 150 to hold the cage door 148 in the open position, and a release position shown in FIG. 19B in which the latch member 150 is pivoted out of the notch 152 so as to permit the cage door 148 to close under the force of gravity. Optionally a biasing member (not shown) may be provided to assist in closing the cage door 148 more quickly than would occur under gravity alone. Alternatively, in embodiments in which gravity is not used to close the cage door 148, the biasing member may itself be the sole driver of the cage door 148 to the closed position, for example, in embodiments where the cage door 148 swings upwards to close, similar to a drawbridge, or in embodiments in which the cage door 148 swings horizontally to close, similar to a typical door in a home.

The cage door 148 can be manually opened by a user. Once it is opened sufficiently that the notch 152 presents itself to the latch member 150, a latch member biasing member (e.g. a torsion spring, not shown) may urge the latch member 150 into engagement with the notch 152 so as to hold the cage door 148 in the open position.

With the cage door 148 in the open position, the user can, via an application that is executed on the computing device 306, capture a virtual reality object 502 in some embodiments, such as embodiments in which the virtual reality object 502 is a virtual reality character that wanders into the cage 106.

A solenoid 154 is shown as an example actuator that is operable to actuate the latch member 150, and therefore actuates the cage door 148 to move from the open position to the closed position. The solenoid 154 may be connected to the latch member 150 by a cable 156, or by any other suitable structure.

With respect to the cage door 148, the first state of the physical apparatus 100 may be the state in which the cage door 148 is open, and the second state of the physical apparatus 100 may be the state in which the cage door 148 is closed.

Figure 2A:
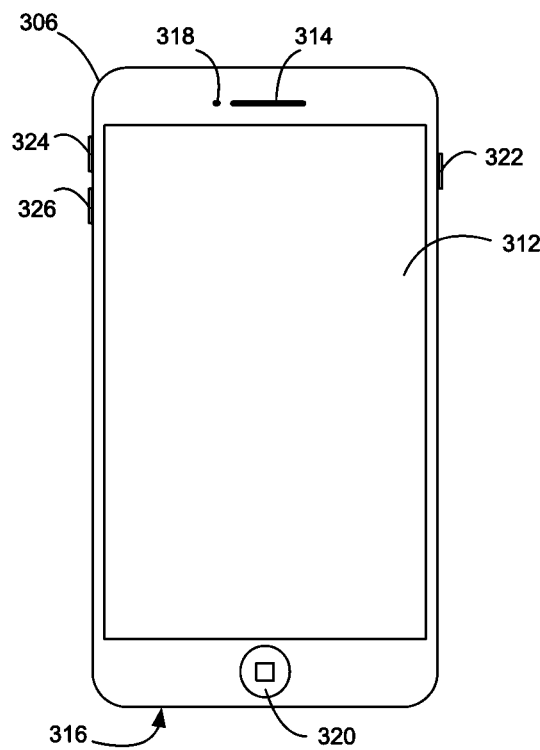
FIG. 2A shows a front side of the computing device of FIG. 1.
Figure 2B:
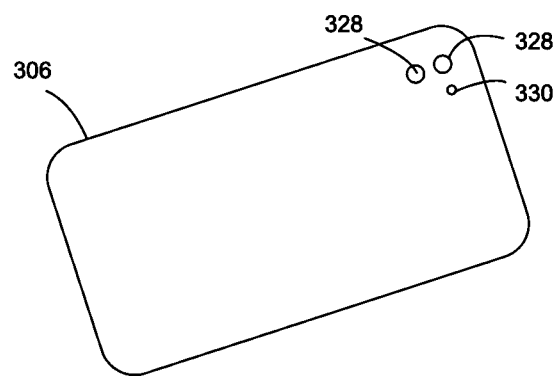
FIG. 2B shows a back side of the computing device of FIG. 2A.

Now referring to FIGS. 2A and 2B, the computing device 306 is shown having a touchscreen display 312, a speaker 314, a microphone 316, a front-facing camera 318, hardware controls in the form of a home button 320, a power button 322, a volume up button 324, a volume down button 326, a pair of rear-facing cameras 328, and a flash 330. The touchscreen display 312 can employ any suitable display for presenting images, such as an LCD display, an OLED display, etc. The touchscreen display 312 enables the registration of input via contact of a user with the touchscreen display 312. The display may be a non-touchscreen display in other embodiments. The computing device 306 can have one or more speakers such as the speaker 314, and one or more microphones, such as the microphone 316. The home button 320 can be used to exit from an application, authenticate a user through the use of a touch sensor in the home button 320, etc. The volume up and down buttons 324, 326 can be provided with additional and/or alternative functionality within certain applications. The rear-facing cameras 328 can be used to capture images of objects, including people, behind the computing device 306. The flash 330 can be used to provide additional illumination for capturing images, and can be provided with additional and/or alternative functionality within certain applications.

Figure 2C:
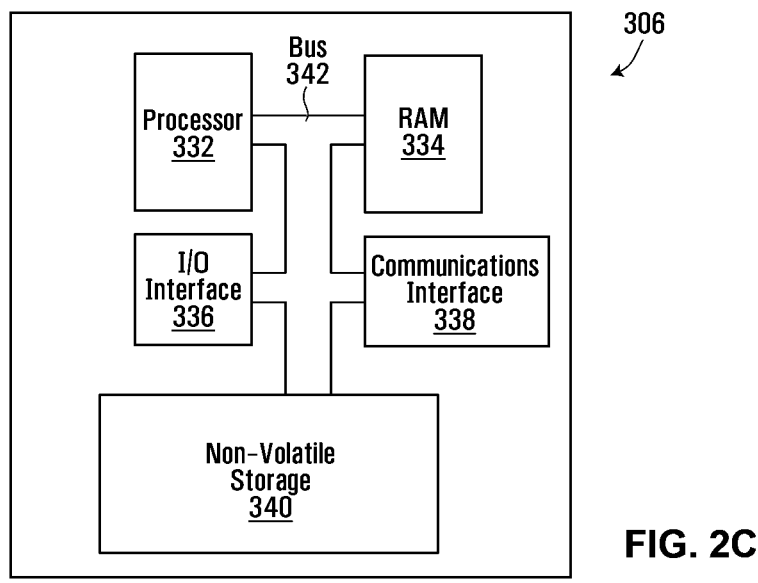
FIG. 2C is a schematic diagram showing various components of the computing device of FIGS. 2A and 2B.

FIG. 2C shows various additional components of the computing device 306. As shown, the computing device 306 has a number of physical and logical components, including a processor 332, random access memory ("RAM") 334, an input/output ("I/O") interface 336, a communications interface 338, non-volatile storage 340, and a local bus 342 enabling the processor 332 to communicate with the other components. The processor 332 executes at least an operating system, and any applications installed on the computing device 306. While shown and described as having a single processor, the computing device 306 can have two or more processors that act to perform the functionality described herein. RAM 334 provides relatively responsive volatile storage to the processor 332. The I/O interface 334 allows for input to be received from one or more devices, such as the home button 320, the touchscreen display 312, the power button 322, the volume up and down buttons 324, 326, the microphone 316, the front- and rear-facing cameras 318, 328, a mouse, etc., and outputs information to output devices, such as the touchscreen display 312 and/or the speaker 314. The communications interface 338 permits communication with other computing devices over data communications networks such as the Internet 308 via wired or wireless communications. The wireless communications can be, for example, via cellular (such as LTE), Wi-Fi, Bluetooth, etc. The non-volatile storage 340 stores the operating system and programs, including computer-executable instructions for implementing the AR application 300. During operation of computing device 306, the operating system, the programs and the data may be retrieved from the non-volatile storage 340 and placed in RAM 334 to facilitate execution. The computer-readable mediums of RAM 334 and the non-volatile storage 340 can also include removable computer-readable media, such as flash cards, USB drives, etc.

In order to use the AR system 20, a user can cause the computing device 306 to download and retrieve the AR application 300 from the server system 304. This may be done, for example, by visiting an "application store" and downloading the AR application 300 to the computing device 306. In an alternative embodiment, the computing device may be pre-loaded with the AR application 300. In another alternative embodiment, the AR application 300 can be made available to the computing device via removable media, such as a flash card, a USB drive, etc.

While, herein, the computing device 306 will be shown and described with reference to a smart phone, other types of computing devices having one or more cameras, one or more displays, one or more communications interfaces, storage for storing the AR application, and one or more processors for executing the AR application as described hereinbelow will occur to those skilled in the art.

Figure 3:
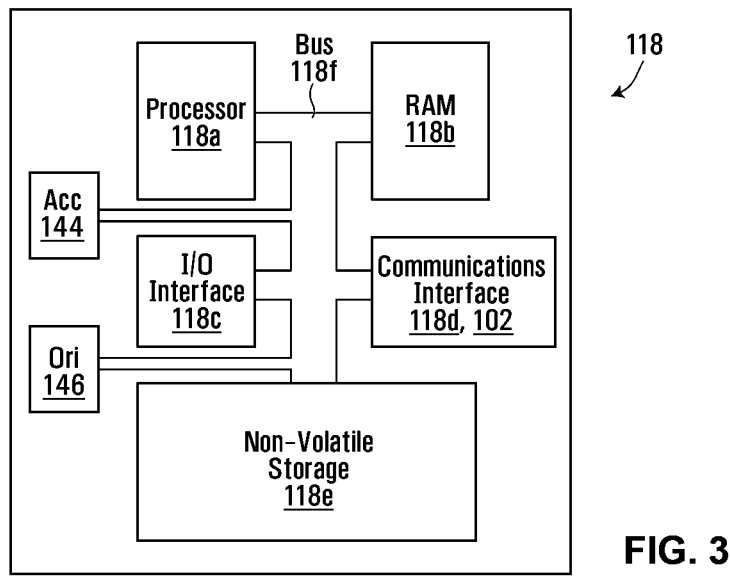
FIG. 3 is a schematic diagram of a controller of the physical apparatus of FIG. 1.
Figure 8:
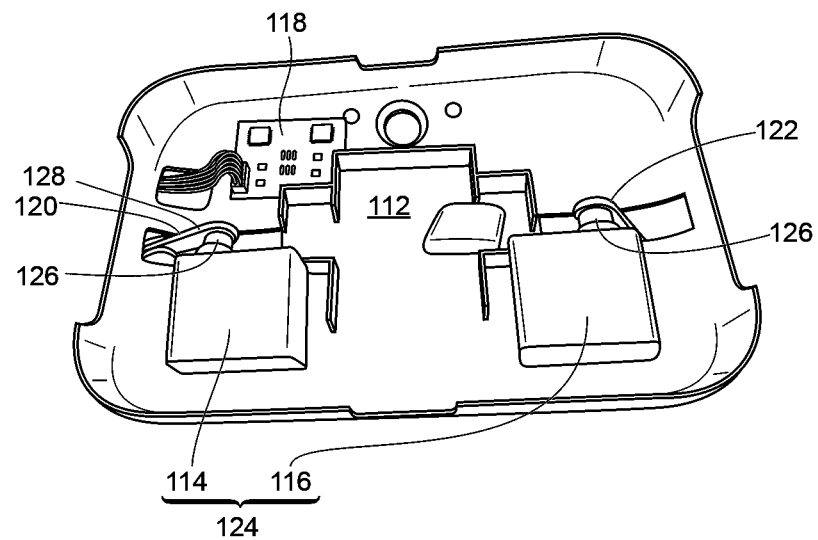
FIG. 8 shows various internal components of the physical apparatus of FIG. 1.

The physical apparatus controller 118 is shown in FIG. 8 and is shown schematically in FIG. 3. The physical apparatus controller 118 controls the operation of the actuator 124 (e.g. by controlling power from a power source such as a battery pack (not shown) to the motors 114 and 116. The physical apparatus controller 118 includes a processor 118a, RAM 118b, an i/o interface 118c, a communications interface 118d and non-volatile storage 118e, which are connected to one another via a bus 118f.

The signal receiver 102 may be connected to physical apparatus controller 118 (e.g. via the i/o interface 118c), so that the physical apparatus controller 118 can receive signals from the signal receiver 102. In such an embodiment the signal receiver 102 may be any suitable type of signal receiver, such as an optical sensor for receiving signals from a light emitting element on the computing device, or a microphone for receiving audio signals emitted by the computing device 306. Alternatively, the signal receiver may be part of the communications interface 118d and may include a Bluetooth chip for receiving signals from the computing device 306 over a Bluetooth network, or a Wi-Fi chip for receiving signals from the computing device 306 over a Wi-Fi network. The signal receiver 102 in the embodiment shown in FIG. 3 is a Bluetooth chip.

The physical apparatus controller 118 is also connected to an optionally provided speaker 142, permitting the physical apparatus 100 to emit sound, so as to enhance the realism of the user experience. The speaker 142 can be used to emit sounds that give the user the impression that the virtual reality object 502 is in the cage 106. The physical apparatus controller 118 can control the output from the speaker 142 based on commands provided via the signals received from the signal receiver 118, and/or from direct interaction of the user with the physical apparatus 100 (e.g. tipping or knocking the physical apparatus 100, or manually moving a movable element of the physical apparatus).

The physical apparatus controller 118 may receive signals from an accelerometer 144. The accelerometer 144 may be, for example, a three-axis accelerometer similar to those used in smartphones currently, and may be mounted directly onto the physical apparatus controller 118, as shown in FIG. 3. The accelerometer 144 may be used for one or more of several purposes. For example, the accelerometer 144 may be used to provide input to the physical apparatus controller 118 that can be transmitted back to the computing device 306 to assist the computing device 306 in determining the instantaneous position of the physical apparatus 100 in the event that the physical apparatus 100 is moved, tipped, knocked. Another purpose for the accelerator 144 may be to provide feedback for the operation of the actuator 124, so as to provide closed-loop control for the actuator 124. This closed-loop control can be used to ensure that the target position for the cage 106 is the actual position that is reached. Furthermore, in situations where the accelerometer 144 indicates that there is a problem and that the cage 106 is unable to reach its intended position (e.g. due to an obstruction), the physical apparatus controller 118 can communicate the position of the cage 106 to the computing device 306 to ensure that the virtual reality object 502 is properly rendered.

The physical apparatus controller 118 may receive signals from an orientation sensor 146. The orientation sensor 146, may be a three-axis orientation sensor (e.g. a three-axis gyro), and may be directly mounted to the physical apparatus controller 118, as shown in FIG. 3. The physical apparatus controller 118 may use signals from the orientation sensor 146 in similar manner to the uses described above for signals from the accelerometer 144, namely, for transmission back to the computing device 306 to assist the computing device 306 to determine the instantaneous orientation (instead of, or in addition to, the instantaneous position noted above) of the physical apparatus 100 in the event that the physical apparatus is moved, tipped or knocked, or to provide closed loop control for the actuator 124, or alternatively, to communicate the orientation of the cage 106 to the computing device in the event that the cage 106 unable to reach its intended orientation, (e.g. due to an obstruction).

Once the AR application 300 has been installed, or otherwise made available for execution, on the computing device 306, the AR application 300 can be executed to commence use of the AR system 20.

Figure 10:
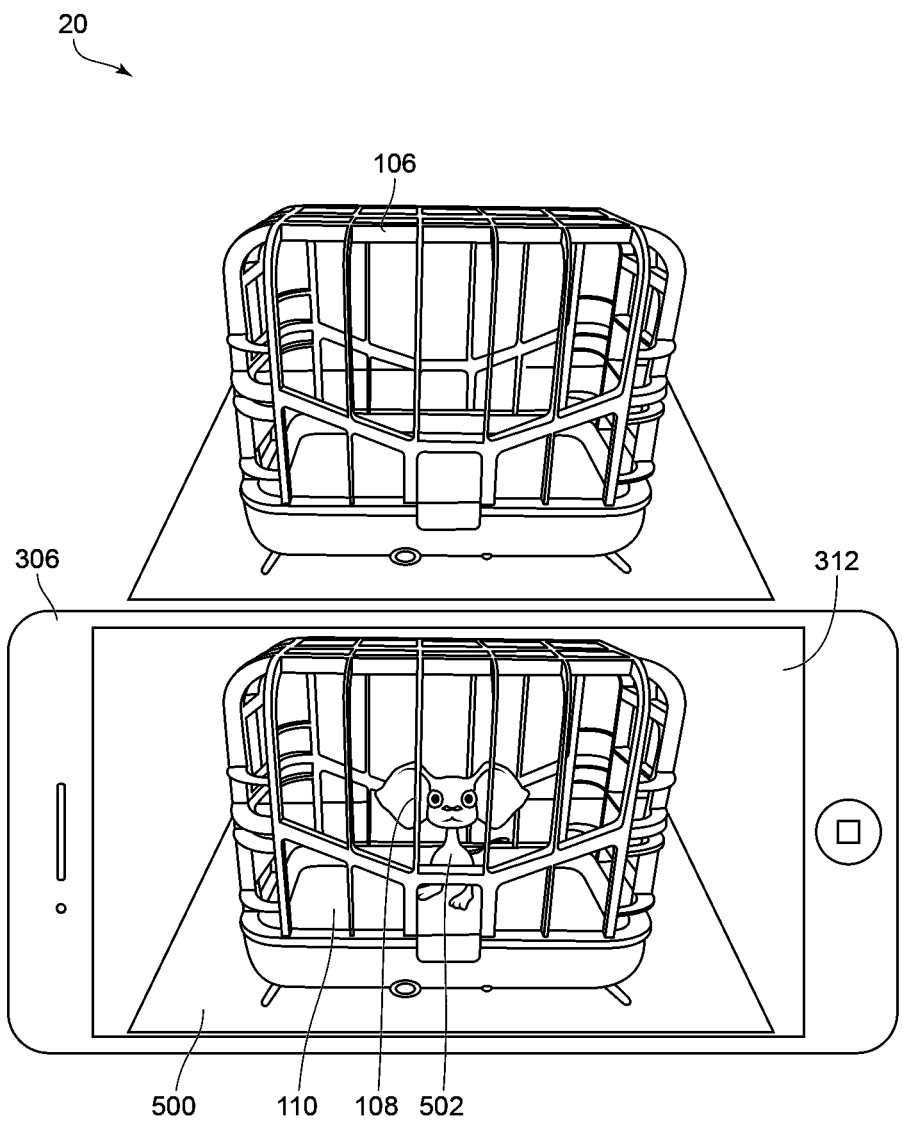
FIG. 10 shows the augmented reality system of FIG. 1, wherein the computing device is positioned to image the physical apparatus and insert a virtual reality figure therein.

FIG. 10 shows the computing device 306 being positioned in front of the physical apparatus 100 so that the physical apparatus 100 is in the field-of-view of the rear-facing cameras 328. As is shown, the AR application 300 generates an AR image 500 of the physical apparatus 100 captured via the rear-facing cameras 328 in which a virtual reality ("VR") object in the form of a VR FIG. 502 is inserted. The AR image 500 is presented on the display 312.

The AR application 300 analyzes the at least one image captured by the two rear-facing cameras 328 and determines the pose of the physical apparatus 100. The pose of the physical apparatus 100 includes the location and orientation of the physical apparatus 100. The AR application 300 employs images from one or both of the rear-facing cameras 328 together with the apparatus data to identify the physical apparatus 100 in the one or more images and determine its pose relative to the computing device 306. The color, fiducial indicia, and model data for the physical apparatus 100 can each assist in identifying the physical apparatus 100 in the image(s). Where model data is available for the physical apparatus 100, the AR application 300 can determine a transformation to apply to the model that best matches the identified physical apparatus 100 in the one or more images. Alternatively, two or more images from the rear-facing cameras 328, either positionally or temporally displaced, can be used to identify depth of field. Where two images that are taken using the same rear-facing camera 328 are used, the change in pose of the computing device 306 between capturing the first and second images can be used to generate depth information for the imaged physical apparatus 100 and other objects. The AR application 300 either generates model data using the one or more images captured with the rear-facing camera 328 or uses the model data provided with the AR application 300 after transformation.

The AR application 300 is configured to generate a VR FIG. 502 in a range of positions in or on the physical object 100. For example, the AR application 300 may be configured to generate the VR FIG. 502 in an initial pose (in a default location) within the physical apparatus 100 (i.e., the cage), and allow the VR FIG. 502 to move within the confines of the cage. Using the model data for the physical apparatus 100, the AR application 300 can generate the VR FIG. 502 so that it does not intersect the physical apparatus 100 represented by the model data. Further, the AR application can occlude portions of the VR character based on line-of-sight to the generated VR FIG. 502 and the position of elements of the physical apparatus 100.

As shown in FIG. 10, the VR FIG. 502 is positioned centrally in the physical apparatus 100 and rests atop of the floor 110 thereof, thus not intersecting any portion of the physical apparatus 100. Further, the bars 108 of the physical apparatus 100 occlude the VR FIG. 502, as would naturally occur if a figure were positioned inside the physical apparatus 100.

The AR application 300 executing on the computing device 306 provides a control interface via the touchscreen display 312. A user can tap, slide, or press on different parts of the touchscreen display 312 corresponding to different parts of the physical apparatus 100 and/or the VR FIG. 502.

In other embodiments, one or more of the hardware controls, such as the volume up and down buttons 324, 326 can trigger certain commands, such as an interaction with the VR character or a state change in the physical apparatus 100.

FIG. 11 shows the AR image 500 presented on the touchscreen display 312 in isolation. As shown, the VR character 502 is positioned centrally within the physical apparatus 100. As previously discussed, the physical apparatus 100 is supported atop of the support surface SS via the two support members 120, 122 in a default state. One mode in which a user can interact with the VR FIG. 502 is to tap on a region TR on the touchscreen display 312.

FIG. 12 shows a AR image 504 after the user has tapped the touchscreen display 312 in the region TR. The VR FIG. 502 is animated to simulate walking atop of the floor 110 towards a side of the physical apparatus 100 adjacent to the region TR. Curiosity of the VR FIG. 502 is expressed by its movement towards the region TR as if the physical apparatus 100 was directly tapped. As the VR FIG. 502 is about to take each step, the AR application 300 sends a command in a signal to the physical apparatus 100 with a state change identifier and a parameter. The state change identifier corresponds to a particular state change, and the parameter(s) correspond to modifiers for the state change. The state change identifiers and parameters are pre-defined to simplify communications between the computing device 306 and the physical apparatus 100. In this described scenario, the state change identifier can correspond to the action "vibrate", and the parameters can indicate the strength of the vibration, the pattern of vibration, the time period during which to vibrate, etc.

In addition, as the VR FIG. 502 travels to the left lateral side of the physical apparatus 100, the AR application 300 directs the computing device 306 to send commands in signals with a state change identifier of "rotate first support member"; i.e., first support member 120. The parameter passed with this state change identifier is the absolute rotation angle of the first support member 120. Alternatively, the parameter can be the relative amount of rotation of the first support member 120. These can be send simultaneously with or interleaved with the vibrate signals.

The VR FIG. 502 stops at a periphery of the range of positions through which the VR FIG. 502 can move. The last command transmitted by the computing device 306 via a signal at the direction of the AR application 300 instructed the physical apparatus 100 to rotate the first support member 120 to lean the cage 106 to a second state as is shown in FIG. 12. This mimics an expected behavior of the cage 106 when a physical object simulated by the VR FIG. 502 travels to one side of the cage 106. The listing of the cage 106, together with the vibrations generated during the footsteps of the VR FIG. 502, assist in bringing the VR FIG. 502 in the cage 106 to life in the mind of the user.

The signals including the commands can be transmitted by the computing device 306 executing the AR application 300 in one of a number of ways. In the presently described embodiment illustrated in FIGS. 1 to 12, the computing device 306 transmits the signals over wireless radio frequency communications systems. While, in this particular embodiment, Bluetooth communications are employed, other wireless radio frequency communications systems, such as Wi-Fi or LTE, can be employed.

In another embodiment, the signals can be sent by the computing device 306 via audio. The AR application 300 can direct the computing device 306 to generate encoded audio signals that are received by a microphone of the physical apparatus 100 and decoded to extract the state change identifiers and parameters. In one particular embodiment, the signals are sent via audio that is ultrasonic.

Where the signals are sent via audio, it is possible that loss may occur due to a noisy environment. It can therefore be desirable to retransmit signals. In such noisy environments, it can be desirable to transmit the signals in advance of a time when a state change is desired of the physical apparatus 100. The parameters can be used to identify timing information for the status changes. In order to avoid synchronizing clocks on the computing device 306 and the physical apparatus 100, the timing information can indicate to effect the identified status change in x seconds. The parameters of commands in subsequent audio signals transmitted can be adjusted to reflect the reduced time period to the time at which the state change is desired to be effected.

In other embodiments, the signals can be transmitted via light. The AR application 300 can control the flash 330 of the computing device 306 to transmit encoded signals via light to a light sensor on the physical apparatus 100.

It can be desirable in some embodiments to synchronize the clock of both the computing device 306 and the physical apparatus 100 in order to express timing information in absolute times.

The signals including the commands can be sent via a combination of two or more of the above modes.

Figure 13A:
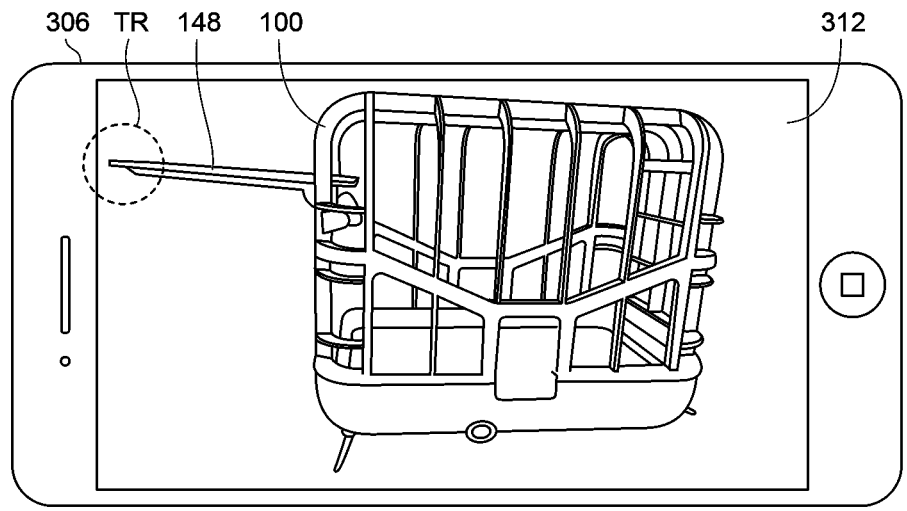
FIGS. 13A and 13B show the computing device of FIG. 1 positioned to image the physical apparatus and enabling interaction with the physical apparatus, and the capture of the VR figure in the cage via the control interface of the computing device.

Using these signals, more complex interactions are enabled. In one particular embodiment, the VR FIG. 502 is initially outside of the cage 106 of the physical apparatus 100. The door of the cage 106 is in an open position, as is shown in FIG. 13A. The VR FIG. 502 is programmed to wander in and out of the cage 106. The user of the mobile device 306 can touch a region TR of the touchscreen display 312 to cause the cage door to close. Upon the user tapping in the region TR, the AR application 300 directs the computing device 306 to send a signal to the physical apparatus 100. The signal includes a command with a state change identifier for closing the door of the cage 106.

Figure 13B:
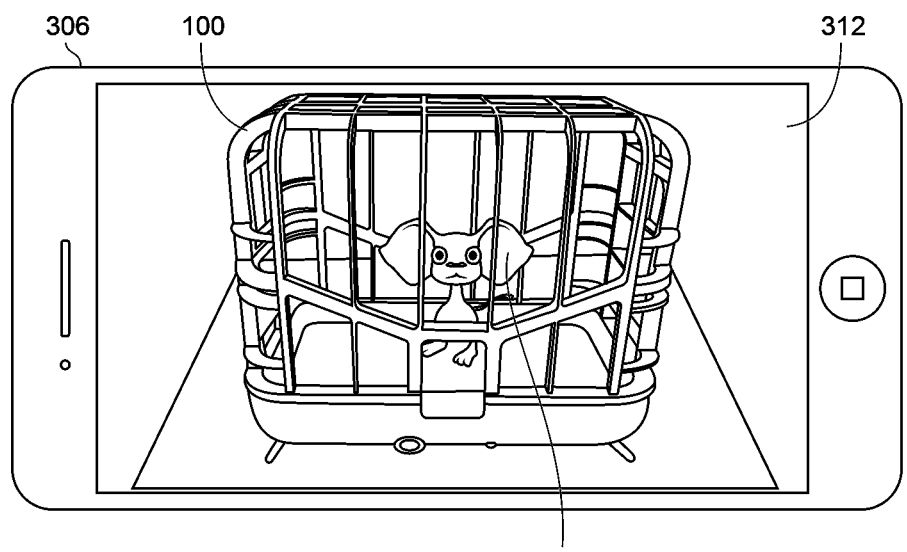

If the VR FIG. 502 was in the cage 106 at the time that the region TR was pressed, the VR FIG. 502 is subsequently shown captured in the cage 106, as is shown in FIG. 13B.

In other embodiments, differentiated buttons can be presented on the touchscreen display 312 to enable the user to interact with the VR FIG. 502 or the physical apparatus 100.

Figure 14A:
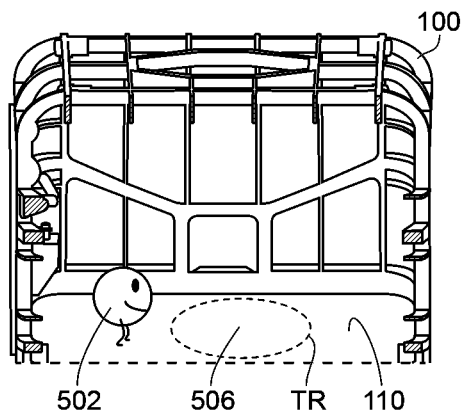
FIGS. 14A to 14C show another interaction sequence of the computing device of FIG. 1, wherein a user interaction opens a trap door in the floor of the cage of the physical apparatus, allowing the VR figure to fall through it.
Figure 14B:
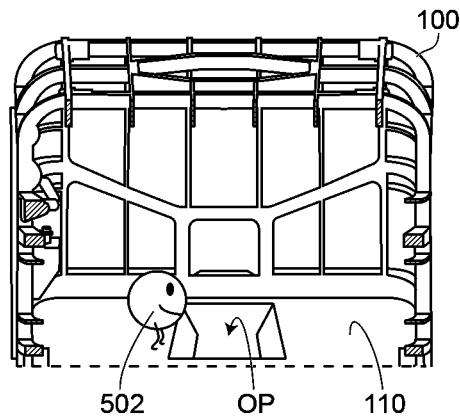
Figure 14C:
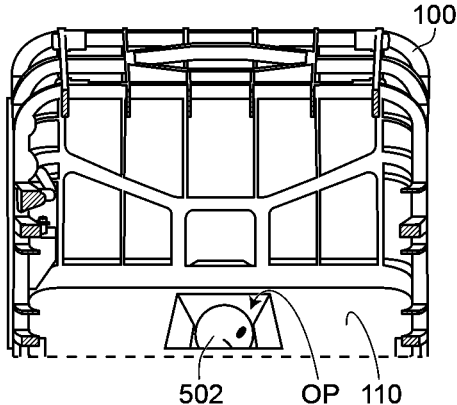

FIGS. 14A to 14C show images presented on the touchscreen display 312 of the computing device 306, wherein user interaction with the control interface causes a physical change in the physical apparatus 100 and leading to an animation sequence of the VR FIG. 502 (in this embodiment illustrated as a humanoid). In FIG. 14A, the floor 110 of the physical apparatus 100 is shown as being continuous. The VR FIG. 502 is shown standing atop of the continuous floor 110. A region TR can be tapped to cause a set of trap doors 506 in the floor 110 of the physical apparatus 100 that are in a closed state to open.

FIG. 14B shows an image presented on the touchscreen display 312 of the computing device 306 after tapping on the region TR. Upon tapping on the region TR, the AR application 300 directs the computing device 306 to send a signal including a command to the physical apparatus 100 to open the trap door in the floor 110. Once the signal is received by the physical apparatus 100, the trap doors 506 are opened and imaged by the rear-facing cameras 328 of the computing device 306 and presented on the touchscreen display 312 in an open state, exposing an opening OP.

FIG. 14C shows a subsequent image presented on the touchscreen display 312 of the computing device 306 a short time after that of FIG. 14B is shown. The VR FIG. 502 has walked over the opening OP and fallen through.

Figure 15:
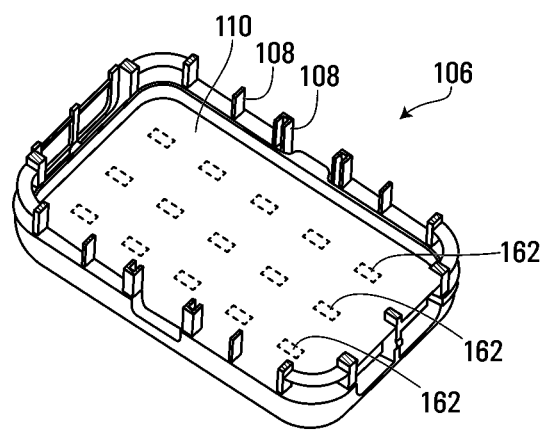
FIG. 15 shows a schematic view of a bottom portion of a physical apparatus in an alternative embodiment having a number of vibration modules.
Figure 16:
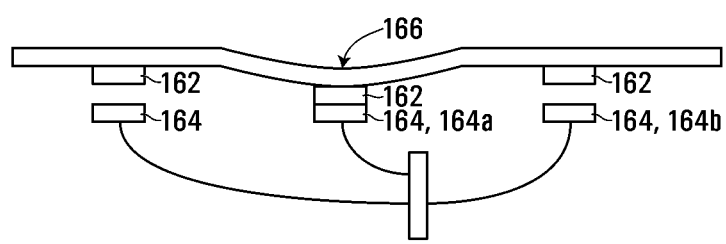
FIG. 16 shows a schematic view of a deformable floor for a physical apparatus in another embodiment that is locally actuated via electromagnets.

Reference is made to FIGS. 15 and 16 which show another example of at least one actuatable element, which in this instance is the floor 110 of the cage 106. The floor 110 may be made of a material that can be elastically deformed by a selected amount. As shown in FIG. 16, on a lower surface 160 of the floor 110 are positioned a plurality of magnetically-responsive elements 162, such as ferritic elements or such as magnets, for example. As can be seen in FIG. 15, these magnetically-responsive elements 162 may be arranged in a uniform array about the floor 110. In an alternative embodiment, the magnetically-responsive elements 162 may be positioned in a non-uniform arrangement about the floor 110.

Underneath the floor, a plurality of electromagnets 164 are provided, each electromagnet 164 positioned facing a corresponding one of the magnetically-responsive elements 162. By energizing an electromagnet 164 (such as the electromagnet identified at 164a in FIG. 16) the corresponding magnetically-responsive element 162 is drawn towards (and optionally into engagement with) the electromagnet 164. As a result, a depression 166 can be seen in the floor 110 from a person viewing the floor from above, which can appear to the user that the virtual reality object 502 is present in that location.

By sequentially activating different electromagnets 164 along a selected path, the appearance of travel of the virtual reality object 502 about the cage 106 can be created.

Alternatively, instead of generating a depression on the floor 110 that is intended to be seen by the user as being caused by the perceived weight of the virtual reality object 502 or by a footstep in that location taken by the virtual reality object 502, it is possible for each electromagnet 164 to be energized and deenergized quickly, so as to cause a brief flutter locally in the floor 110, which can convey to the user that the virtual reality object 502 has taken a footstep in that location.

The electromagnets 164 are shown in FIG. 16 as being connected via electrical conduits to the physical apparatus controller 118, and their operation is controlled by the physical apparatus controller 118, optionally based on signals received by the physical apparatus controller 118 from the computing device 306 via the signal receiver 102.

In the embodiment shown in FIGS. 15 and 16, the first state of the physical apparatus 100 may be the state in which the floor 110 is undisturbed by any of the electromagnets 164 (e.g. as shown in FIG. 15), and the second state may be the state in which the floor 110 is depressed by one of the electromagnets 164, as shown in FIG. 16. Alternatively, it can be determined that the first state could be the state in which a first one of the electromagnets (e.g. electromagnet 164a) causes a depression or a disturbance in the floor 110 in a first location (e.g. directly above the first electromagnet 164a, as shown in FIG. 16) and the second state of the physical apparatus 100 may be the state in which a second one of the electromagnets (shown in FIG. 16 at 164b) causes a depression or a disturbance in the floor 110 in a second location (e.g. directly above the second electromagnet 164b).

In embodiments in which the floor 110 is depressed or is otherwise disturbed, it is possible to enhance the visual disturbance that is provided by energization of the electromagnets 164 by dispersing a loose material on the floor 110 such as sand or granules of some other suitable loose material.

Figure 9:
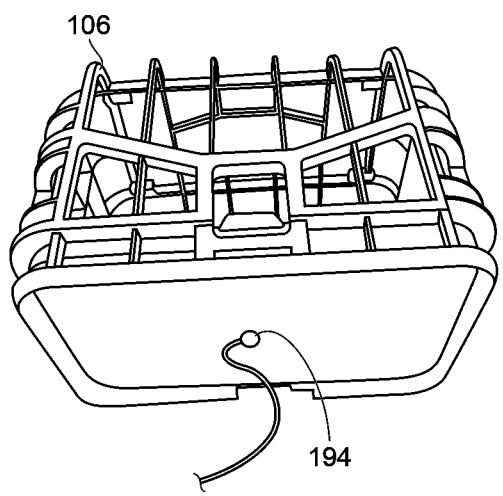
FIG. 9 shows a vibration module positioned under the floor of the physical apparatus of FIG. 1.

In an embodiment shown in FIG. 9, a vibration module 194 is shown and may be operated by the physical apparatus controller 118 in brief spurts to simulate footsteps taken by the virtual reality object 502. The vibration module 194 may be similar to the vibration modules found in smartphones, for example. The vibration module 194 may be particularly useful when combined with loose material on the floor 110 as described above.

Figure 17:
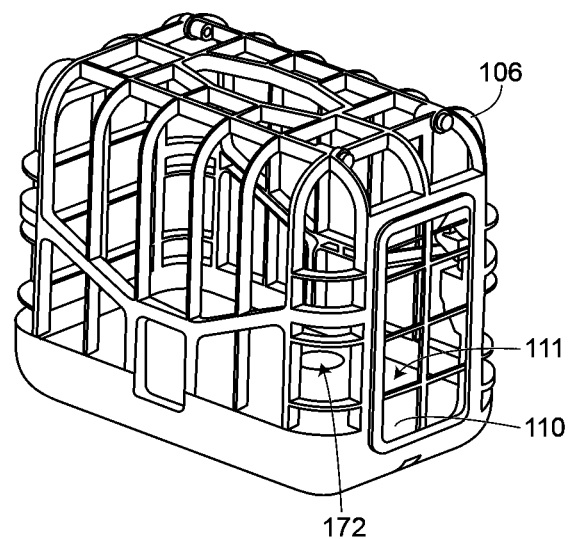
FIG. 17 shows a physical apparatus in accordance with another embodiment, wherein LEDs are positioned along a bottom surface of the top of the physical apparatus to selectively illuminate one or more positions on the floor of the physical apparatus.
Figure 18:
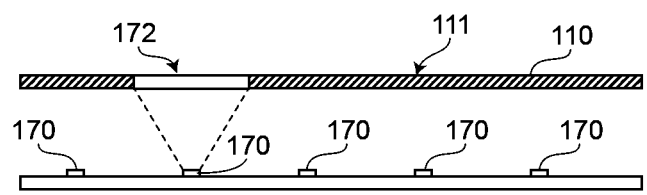
FIG. 18 is a schematic diagram of a floor design for a physical apparatus in accordance with another embodiment, wherein LEDs are positioned below an opaque floor to illuminate one or more positions on the floor.

Reference is made to FIGS. 17 and 18, which show an alternative embodiment in which there is another example of at least one controllable element. In this embodiment, the at least one controllable element does not move. Instead, the at least one controllable element includes a plurality of light-emitting elements 170, which are positioned beneath the floor 110 as can be seen in FIG. 18, and which point upwards to illuminate the floor 110 from underneath. The floor 110 in the embodiment shown in FIGS. 17 and 18 is sufficiently transmissive of the light emitted by the light-emitting elements 170 (i.e., translucent) that the user can see the illumination on a surface 111 of the floor 110 (i.e., from above the floor 110). A spot of illumination is shown in FIGS. 17 and 18 at 172. The light-emitting elements 170 may be mounted directly to a printed-circuit board as shown in FIG. 18, or may be connected via electrical conduits in any suitable way to permit the physical apparatus controller 118 to control their operation individually. Each light-emitting element 170 may thus be energized so as to illuminate a selected location of the surface 111 of the floor 110 of the cage 106 so as to appear to the user that the virtual reality object 502 is present in that location. By energizing and deenergizing successive ones of the light-emitting elements 170, the appearance that the virtual reality object 502 is travelling about the cage 106 can be created.

In the embodiments shown in FIGS. 19A and 19B, 15 and 16, and 17 and 18, the change in state is at least visual in the sense that it is detectable by the user visually. Embodiments can be provided wherein the change in state is detectable by the user aurally either alternatively or additionally to visually detecting the change in state. For example, in the embodiment shown in FIGS. 19A and 19B, when the cage door 148 moves to the closed position with the virtual reality object 502 present inside the cage the virtual reality object 502 (in embodiments in which it is a virtual reality character) may emit a surprised sound.

In some embodiments, the physical apparatus 100 includes an electrical port 190 that either acts as a connection to a source of electrical power to operate the physical apparatus 100 or is a connection to a source of electrical power to charge an onboard battery pack that may be present in the physical apparatus, as noted above.

In some embodiments the physical apparatus 100 includes an indicator light 192 that indicates the status of the physical apparatus such as whether it is on or off or charging in embodiments that permit charging. The operation of the indicator light 192 is controlled by the physical apparatus controller 118.

Computer-executable instructions for implementing the AR application can be provided in other manners, such as a web application.

In an alternative embodiment, the AR application does not include apparatus data for the physical apparatus. The AR application may, instead, be used with an arbitrary apparatus or object.

Although specific advantages have been enumerated above, various embodiments may include some, none, or all of the enumerated advantages.

The term 'figure' and 'character' are used interchangeably in the present specification.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS

20 AR system
100 physical apparatus
102 signal receiver
104 controllable element
106 cage
108 bars
110 floor
111 surface
112 storage chamber
114 first motor
116 second motor
118 controller
120 first support member
122 second support member
124 actuator
126 output shaft
128 first arm
130 second arm
136 feet
118a processor
118b RAM
118c i/o interface
118d communications interface
118e non-volatile storage
118f bus
142 speaker
144 accelerometer
146 orientation sensor
148 cage door
150 latch member
152 notch
154 solenoid
156 cable
160 lower surface
162 magnetically-responsive elements
164 electromagnet
166 depression
170 light-emitting elements
172 spot of illumination
190 electrical port
192 indicator light
300 AR application
302 storage
304 server system
306 computing device
308 Internet
310 cellular base station
312 touchscreen display
314 speaker
316 microphone
318 front-facing camera
320 home button
322 power button
324 volume up button
326 volume down button
328 rear-facing camera
330 flash
332 processor
334 RAM
336 I/O interface
338 communications interface
340 non-volatile storage
342 local bus
500 AR image
502 VR FIG.
504 AR image
SS support surface
TR tap region

What is claimed is:

1. An augmented reality system, comprising:
a physical apparatus having: a platform;
at least one support connected to and supporting the platform on a surface, the at least one support being actuatable to move relative to the platform between at least a first position and a second position to cause the platform to move relative to the surface on which the physical apparatus is resting; and
a signal receiver for receiving a signal; and
an augmented reality application in the form of computer-readable instructions stored on a computer readable medium, the augmented reality application, when executed by at least one processor of a computing device, the computing device having at least one camera and a display, cause the computing device to capture at least one image of the physical apparatus, generate a virtual reality object that is presented in the at least one image on the display, and transmit at least a first signal and a second signal to the signal receiver of the physical apparatus with a command to cause the at least one support to move from one of the first position and second position to the other of the first position and second position;
wherein the command transmitted with each of the first signal and the second signal includes timing delay information for switching between the first position and the second position, and wherein a difference between the timing delay information for the first signal and the timing delay information for the second signal is at least partially based on a difference in transmission times of the first signal and the second signal.

2. The augmented reality system according to claim 1, wherein the at least one support includes at least two supports that are actuatable to move relative to the platform between at least two positions, each of the at least two supports being actuatable to independently move relative to the platform.

3. The augmented reality system according to claim 1, wherein when the augmented reality application is executing on the computing device, the computing device provides a control interface enabling a user to at least partially control at least one of a behavior of the virtual reality object and a state change of the physical apparatus.

4. The augmented reality system according to claim 3, wherein when the user controls the behavior of the virtual reality object, the augmented reality application can determine a resulting status change in the physical apparatus and transmit a signal to the physical apparatus to effect the state change.

5. An augmented reality system, comprising:
a physical apparatus having at least one light-emitting element to selectively illuminate at least one position relative to the light-emitting element, and a signal receiver for receiving a signal; and an augmented reality application in the form of computer-readable instructions stored on a computer readable medium, the augmented reality application, when executed by at least one processor of a computing device, the computing device having at least one camera and a display, cause the computing device to capture at least one image via the at least one camera, generate a virtual reality object that is presented in the at least one image on the display, and transmit at least a first signal and a second signal to the signal receiver of the physical apparatus with a command to cause the at least one light-emitting element of the physical apparatus to selectively illuminate one of the at least one position on a surface adjacent to or at a location of the virtual reality object on the display wherein the command transmitted with each of the first signal and the second signal includes timing delay information, and wherein a difference between the timing delay information for the first signal and the timing delay information for the second signal is at least partially based on a difference in transmission times of the first signal and the second signal.

6. The augmented reality system according to claim 5, wherein the at least one light-emitting element is at least two light-emitting elements, wherein the at least one position is at least two positions, and wherein each of the at least two light-emitting elements is configured to illuminate a separate one of the at least two positions.

7. The augmented reality system according to claim 6, wherein the surface is provided by a translucent material, and wherein each of the at least two light-emitting elements illuminates the surface from an underside thereof.

8. An augmented reality system, comprising:
a physical apparatus operable to change detectably by a human between a first state and a second state, the physical apparatus having:
  a signal receiver for receiving a signal; and
  at least one controllable element operable to effect the change between the first state and the second state according to a command; and
an augmented reality application in the form of computer-readable instructions stored on a computer readable medium, the augmented reality application, when executed by at least one processor of a computing device, the computing device having at least one camera and a display, cause the computing device to capture at least one image of the physical apparatus, generate a virtual reality object that is presented in the at least one image on the display, and transmit at least the first signal and a second signal to the signal receiver of the physical apparatus with a command to cause the at least one controllable element of the physical apparatus to switch between the first state and the second state;
wherein the command transmitted with each of the first signal and the second signal includes timing delay information for switching between the first state and the second state, and wherein a difference between the timing delay information for the first signal and the timing delay information for the second signal is at least partially based on a difference in transmission times of the first signal and the second signal.

9. The augmented reality system according to claim 8, wherein the change in state is at least mechanical.

10. The augmented reality system according to claim 9, wherein the physical apparatus includes at least one actuatable element coupled to an actuator for actuating the at least one actuatable element, and wherein the signal can direct the physical apparatus to actuate the at least one actuatable element.

11. The augmented reality system according to claim 10, wherein the physical apparatus includes a platform, wherein the at least one actuatable element includes at least one support connected to the platform and supporting the platform on a surface, and wherein the actuator includes a motor.

12. The augmented reality system according to claim 11, wherein the at least one support includes at least two supports that are movable relative to the platform via the at least one motor, each of the at least two supports being independently movable relative to the platform.

13. The augmented reality system according to claim 8, wherein the change in state is at least visual.

14. The augmented reality system according to claim 13, wherein the physical apparatus further comprises at least one light-emitting element.

15. The augmented reality system according to claim 8, wherein the change in state is at least audible, and wherein the physical apparatus includes a speaker.

16. The augmented reality system according to claim 15, wherein the physical apparatus further comprises a percussion element that is actuatable to strike one of another element of the physical apparatus and a surface upon which the physical apparatus is resting to generate a sound.

17. The augmented reality system according to claim 8, wherein the signal is at least partially audial, and wherein the computing device includes a speaker for transmitting the signal.

18. The augmented reality system according to claim 17, wherein the signal is at least partially ultrasonic audio.

19. The augmented reality system according to claim 8, wherein the signal includes a state change identifier corresponding to a change in state to be effected by the physical apparatus.

20. The augmented reality system according to claim 19, wherein the signal includes at least one parameter associated with the state change identifier for modifying the state change to be effected by the physical device.

21. The augmented reality system according to claim 20, wherein the at least one parameter includes timing information for timing the state change.

22. The augmented reality system according to claim 8, wherein, when the augmented reality application is executing on the computing device, the computing device provides a control interface enabling a user to at least partially control at least one of a behavior of the virtual reality object and a state change of the physical apparatus.

23. The augmented reality system according to claim 22, wherein when the user controls the behavior of the virtual reality object, the augmented reality application can determine a resulting status change in the physical apparatus and transmit a signal to the physical apparatus to effect the state change.

* * * * *